United States Patent [19]
Nariyasu

[11] Patent Number: 6,092,833
[45] Date of Patent: Jul. 25, 2000

[54] AIR BAG MOUNTING STRUCTURE FOR PASSENGER-SIDE AIR BAG DEVICE

[75] Inventor: Tsutomu Nariyasu, Shiga, Japan

[73] Assignee: Takata Corporation, Tokyo, Japan

[21] Appl. No.: 09/037,429

[22] Filed: Mar. 10, 1998

[30] Foreign Application Priority Data

Mar. 14, 1997 [JP] Japan .................................... 9-060813

[51] Int. Cl.[7] ................................................ B60R 21/16
[52] U.S. Cl. ...................................................... 280/728.2
[58] Field of Search ............................... 280/728.2, 732, 280/743.1, 730.1, 728.1, 730.2

[56] References Cited

U.S. PATENT DOCUMENTS

| | | | |
|---|---|---|---|
| 5,431,432 | 7/1995 | Webber et al. ....................... | 280/728.2 |
| 5,460,400 | 10/1995 | Davidson . | |
| 5,603,523 | 2/1997 | Rhule et al. . | |
| 5,607,179 | 3/1997 | Lenart et al. ......................... | 280/728.2 |
| 5,639,112 | 6/1997 | Phillion et al. ....................... | 280/728.2 |
| 5,775,724 | 7/1998 | Tonooka et al. ...................... | 280/728.2 |
| 5,876,058 | 3/1999 | Nemoto ................................. | 280/728.2 |
| 5,899,485 | 5/1999 | Folsom et al. ........................ | 280/728.2 |

FOREIGN PATENT DOCUMENTS 0 739 788  10/1996  European Pat. Off. .

Primary Examiner—Brian L. Johnson
Assistant Examiner—Tony Winner
Attorney, Agent, or Firm—Kanesaka & Takeuchi

[57] ABSTRACT

An air bag mounting structure for a passenger-side air bag is formed of a retainer, an air bag, and a mounting frame for fixing the air bag to the retainer. The retainer includes an inflator housing for receiving an inflator therein, a neck portion formed at one side of the inflator housing, and an air bag housing for retaining the air bag. The air bag housing has a collar portion extending laterally outwardly from the neck portion above the inflator housing. The mounting frame is situated inside the air bag housing, and has a flange disposed on the collar portion above the neck portion. When the air bag is attached to the retainer, the mouth of the air bag is sandwiched between the collar portion and the flange in the air bag housing. Thus, gas leakage between the air bag and the retainer can be prevented.

6 Claims, 6 Drawing Sheets

AIR BAG MOUNTING STRUCTURE FOR PASSENGER-SIDE AIR BAG DEVICE

FIELD OF THE INVENTION

The present invention relates to an air bag device installed for a passenger seat in a vehicle, and more particularly to a structure for fixing a peripheral edge of an air bag to a retainer of an air bag device.

BACKGROUND OF THE INVENTION

A conventional air bag mounting structure for a passenger-side air bag device (e.g. JPA H07-69157) will be described with reference to FIGS. 5 and 6. An inflator 12 is arranged in a rear portion (the innermost portion) of a retainer 10. A passenger-side air bag 14 is provided with four flaps 18, 20, 22, 24 arranged around a gas inlet 16 of the air bag 14. The edge portions of flaps 18–24 are turned up and sewn on the respective lapped portions of the flaps so as to form narrow saccate portions 18a, 20a, 22a, and 24a. Numeral 26 designates seams.

Plates 28, 30 are inserted into the respective saccate portions 18a–24a. The plates 28, 30 are each provided with rivet holes 32 formed therein. The flaps 18–24 of the air bag 14 and the retainer 10 are also provided with rivet holes 34 formed in the same arrangement of the rivet holes 32.

The saccate portions 18a–24a with the plates 28, 30 therein are brought in contact with the inner surfaces of the front portion of the retainer 10 and fastened together by blind rivets 38. In this way, the air bag 14 is fixed to the retainer 10 as shown in FIG. 6.

In this conventional structure in a passenger-side air bag device, there are spaces C between the adjacent flaps 18–24. Therefore, there is a possibility of gas leaking from the spaces C when the inflator 12 is activated. For this, it is required to employ a large-capacity inflator as the inflator 12 for compensating for the amount of gas to be leaked.

OBJECT AND SUMMARY OF THE INVENTION

It is an object of the present invention to provide an air bag mounting structure for a passenger-side air bag device having little possibility of gas leaking from portions where a passenger air bag is mounted to a retainer.

In an air bag mounting structure for a passenger-side air bag device according to the present invention, a portion around a gas inlet of an air bag is fixed to a retainer. the air bag comprises a sleeve-like mouth surrounding the periphery of said gas inlet, an end portion of said mouth being inserted into a mounting frame and turned up to sandwich said frame. The frame and said mouth are inserted into said retainer in such a manner that the mouth is disposed between said frame and the retainer, and said frame is fixed to the retainer by fastening members penetrating the retainer, whereby said air bag is fixed to said retainer.

In the air bag mounting structure according to the present invention, the sleeve-like mouth surrounds the frame portion of the mounting frame and the mouth is disposed between the neck of the retainer and the frame portion of the mounting frame all around thereof. The whole outer periphery of the flame portion and the whole inner periphery of the neck are sealingly closed by the mouth. That is, the mouth functions as a sealing member. The result is little gas leakage from a portion where the air bag is attached.

BRIEF DESCRIPTION OF THE DRAWINGS

FIG. 6a is a perspective view showing the conventional example and FIG. 6b is a sectional view taken along a line 6b—6b of FIG. 6a.

DESCRIPTION OF THE PREFERRED EMBODIMENTS

Figure 1:
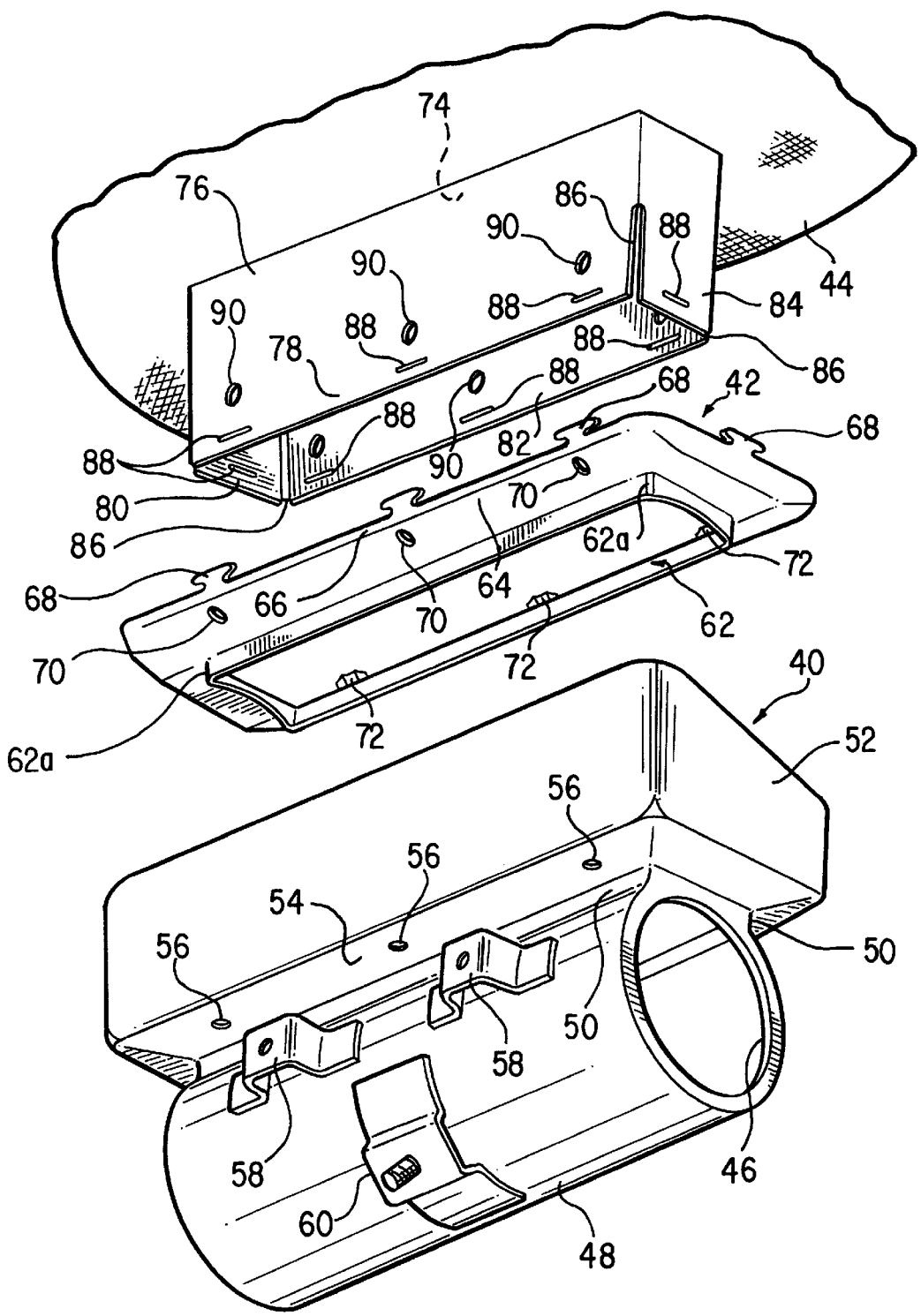
FIG. 1 is an exploded perspective view showing an embodiment.
Figure 2:
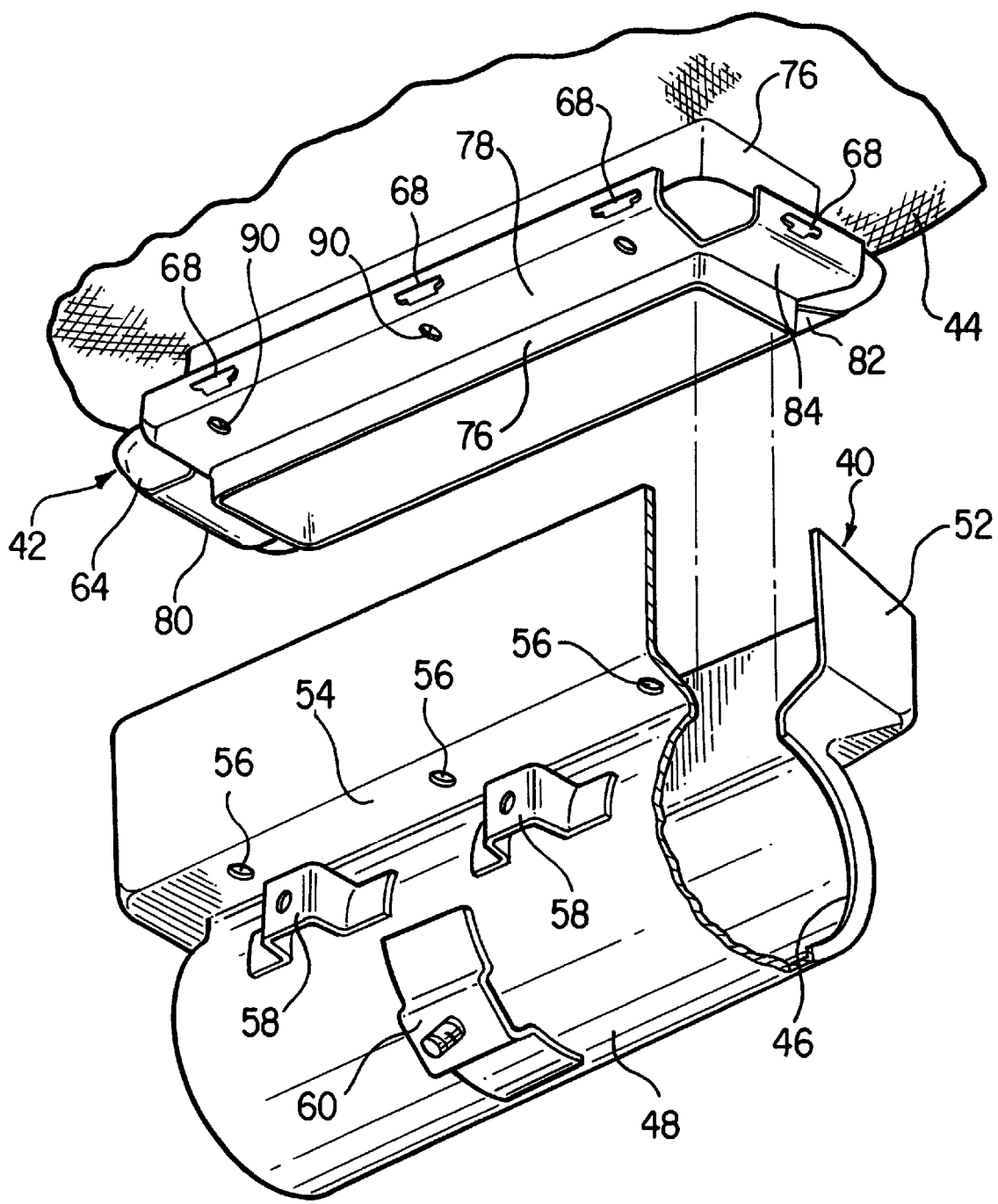
FIG. 2 is an exploded perspective view showing the embodiment.
Figure 3:
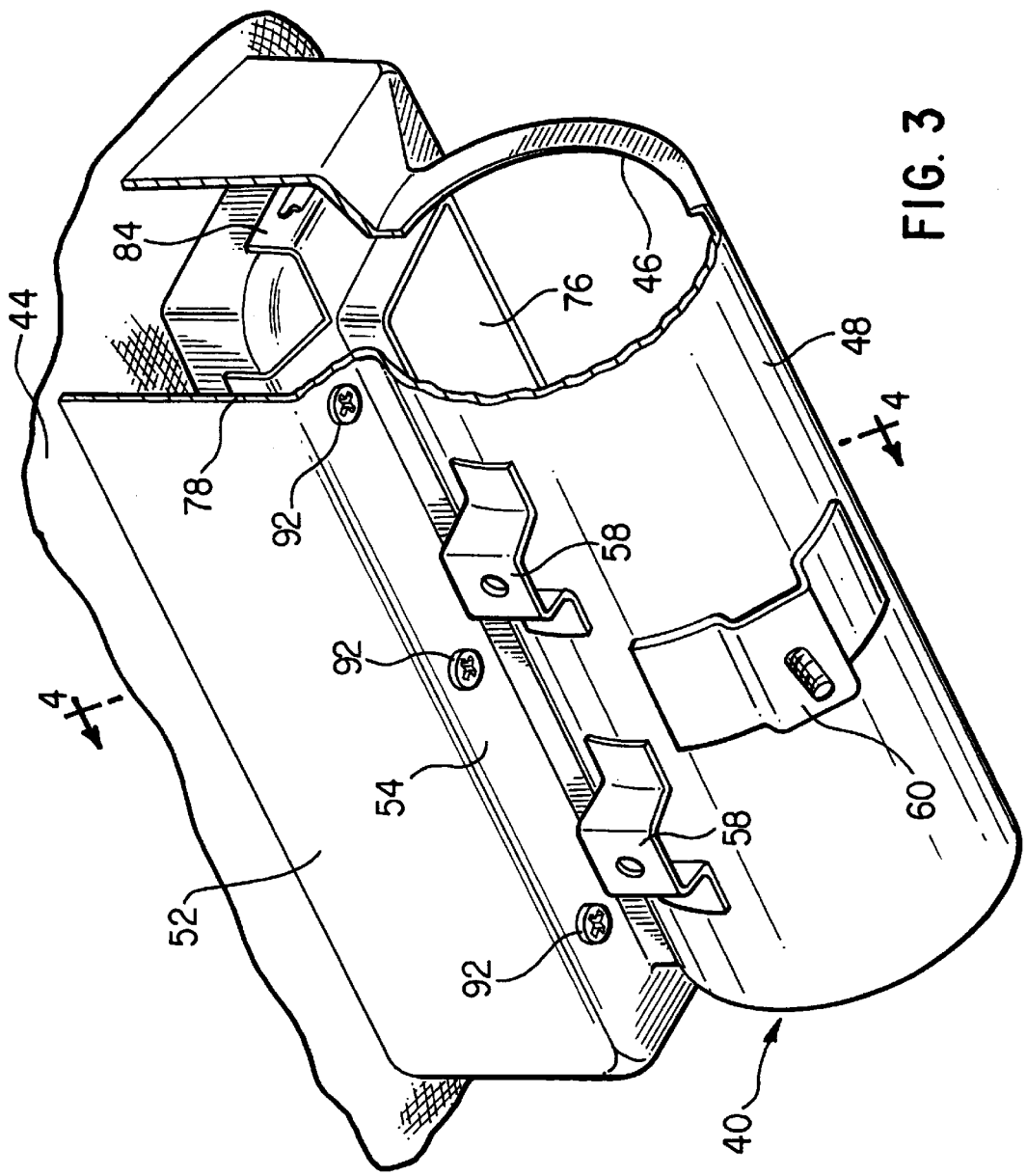
FIG. 3 is a partially cutaway perspective view showing the embodiment.
Figure 4:
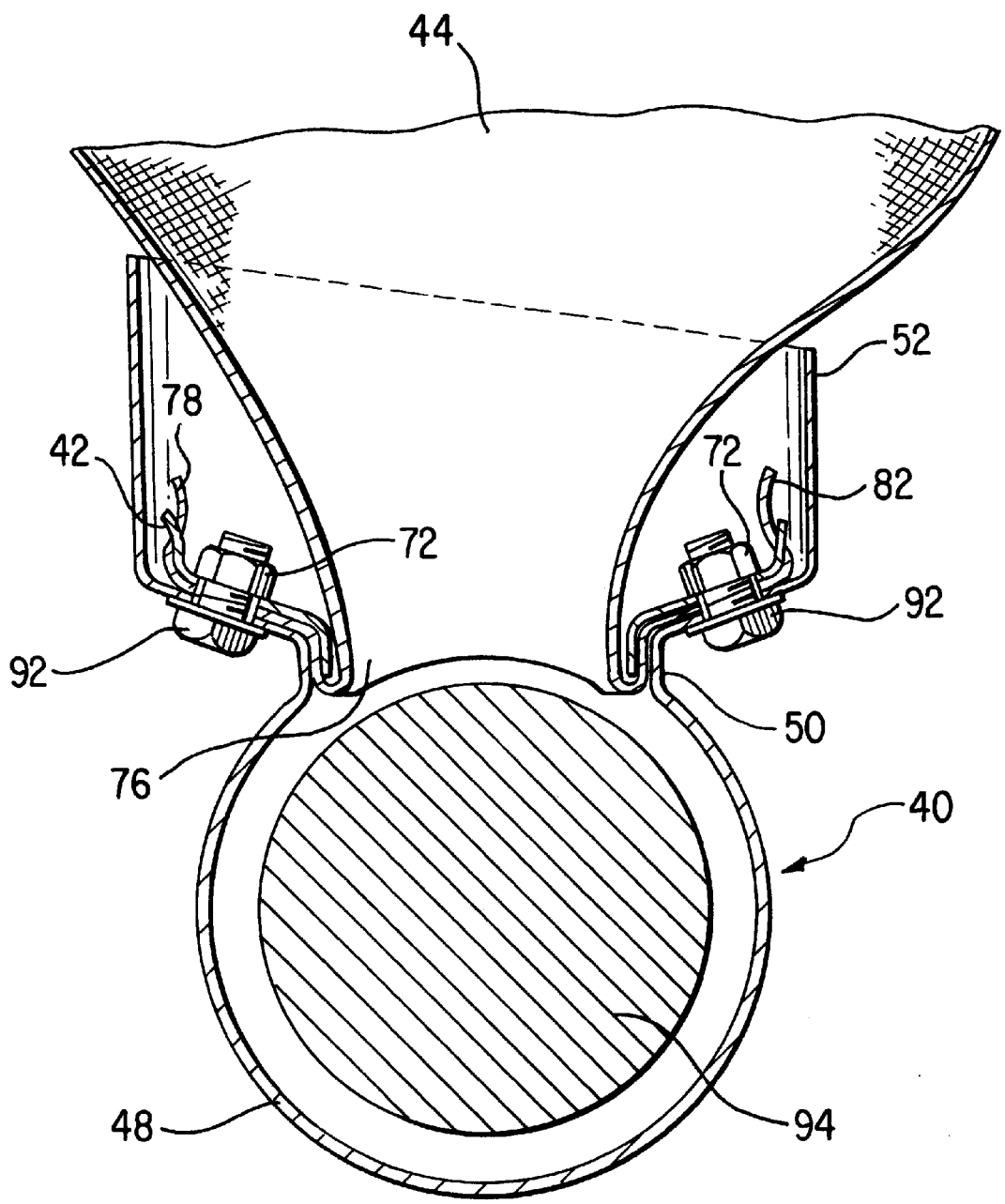
FIG. 4 is a sectional view taken along a line 4—4 of FIG. 3.
Figure 5:
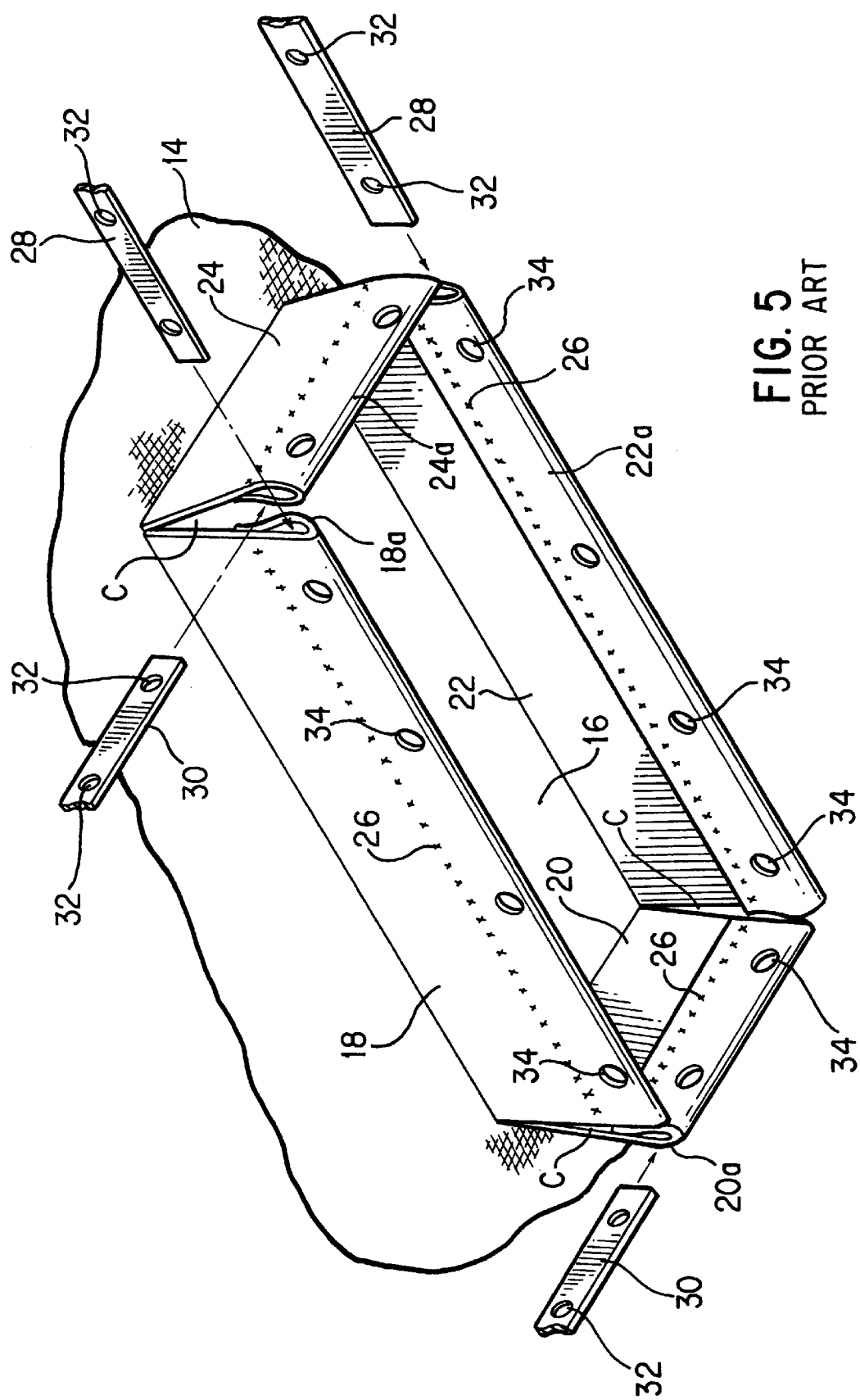
FIG. 5 is an exploded perspective view showing a conventional example.
Figure 6A:
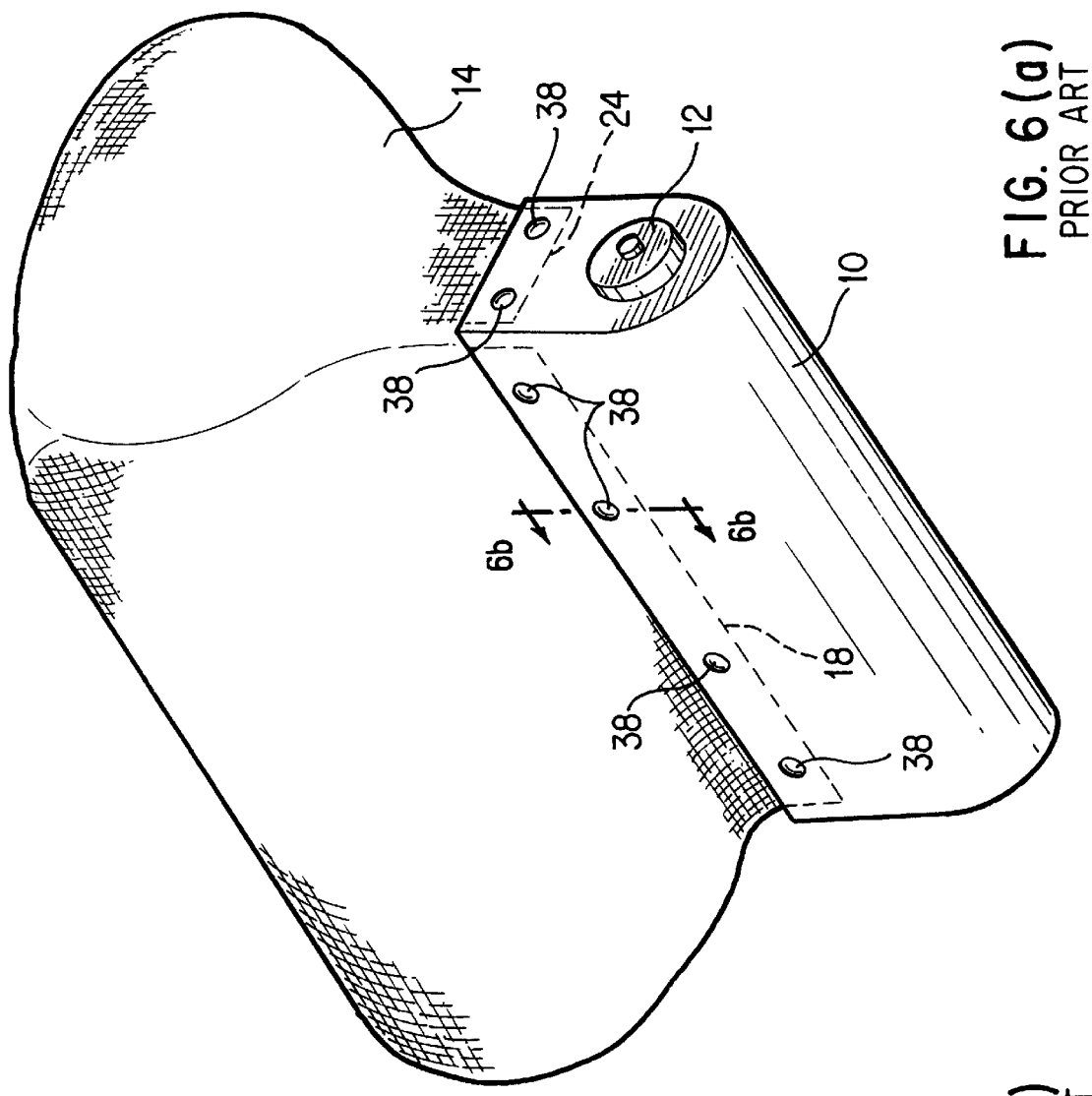
Figure 6B:
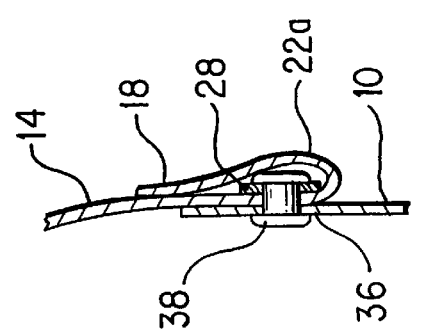

Hereinafter, an embodiment of the present invention will be described with reference to the attached drawings. FIGS. 1 and 2 are exploded perspective views showing an air bag mounting structure for a passenger-side air bag device according to the embodiment of the present invention, FIG. 3 is a partially cutaway perspective view showing the same structure, and FIG. 4 is a sectional view taken along a line 4—4 of FIG. 3.

In this embodiment, a passenger air bag 44 is mounted to a retainer 40 through a mounting frame 42.

The retainer 40 comprises an inflator housing 48 having an opening 46 through which an inflator is inserted, a neck 50 connected to the inflator housing 48, and an air bag housing 52 connected to the neck 50.

The inflator housing 48 is formed in a cylindrical drum-like configuration and has the opening 46 for the inflator formed in one of end faces thereof.

The air bag housing 52 is formed in a rectangular container-like configuration to have a dimension wider than the neck 50. The air bag housing 52 has a collar portion 54 connected to the neck 50, the collar portion constituting the bottom of the air bag housing 52. The collar portion 54 is provided with bolt holes 56 formed therein.

Numerals 58, 60 designate brackets for securing the passenger-side air bag device to a member of a vehicle body.

The mounting frame 42 comprises a frame portion 62 which is inserted into the neck 50, a flange 64 extending outwardly from the frame portion 62, an uprising portion 66 standing on the peripheral edge of the flange 64, and hooks 68 projecting from the uprising portion 66.

The flange 64 is set to be overlaid on the collar portion 54 and is provided with holes 70 at portions corresponding to the bolt holes 56. Nuts 72 are fixed to the frame 42 coaxially with the respective holes 70 by welding or the like.

The passenger air bag 44 is provided with a quadrangular mouth 76 around a gas inlet 74 and the quadrangular mouth 76 has four flaps 78, 80, 82, 84 extending from the peripheral edge thereof. The flaps 78 through 84 are separated from each other by slits 86. The flaps 78 and 82 are each provided with hook entries 88 and bolt holes 90 to be aligned with the bolt holes 56. The flaps 80, 84 are each provided with a hook entry 88 only.

To mount the air bag 44 to the retainer 40, first the flaps 78 through 84 and the mouth 76 are inserted into the frame portion 62 of the mounting frame 42. After the mouth 76 is inserted into the frame portion 62, the mouth 76 are turned up to sandwich the frame portion 62 from the inside and the outside. The flaps 78 through 84 are brought in contact with the outer surface of the flange 64 and the uprising portion 66 so that the hooks 68 are inserted into the hook entries 88.

Then, the air bag 44 with the frame 42 is inserted into the retainer 40 in such a manner that the frame portion 62 covered with the mouth 76 is inserted into the neck 50. The flange 64 is disposed to face the collar portion 54. Therefore, the flaps 78 through 84 are in the state sandwiched between the flange 64 and the collar portion 54. In this state, bolts 92 are screwed up into the nuts 72 through the bolt holes 56, 90. In this way, the air bag 44 is fixedly connected to the retainer 40.

To complete a passenger-side air bag device, the air bag 44 is folded and accommodated in the air bag housing 52. Then, a lid (not shown) is put on the air bag housing 52 and an inflator 94 is installed into the retainer 40.

In this structure for fixing the air bag 44 to the retainer 40 as mentioned above, the frame portion 62 of the frame 42 is inserted into the neck 50 so that the mouth 76 exists over the whole outer periphery of the frame portion 62 and the whole inner periphery of the neck 50. That is, the mouth 76 exists over the outer surfaces of corners 62a of the frame portion 62, thereby improving the gas seal performance between the frame portion 62 and the neck 50 and eliminating the possibility of gas leaking outside from the gap between the frame 42 and the neck 50.

In the above embodiment, the flaps 78 through 84 are held between the flange 64 and the collar portion 54, thereby obtaining high mounting strength of the air bag 44. The hook entries 88 and the hooks 68 are engaged with each other, thereby significantly improving the work efficiency of attaching the air bag 44 to the retainer 40 and further improving the mounting strength between the air bag 44 and the retainer 40.

As mentioned above, according to the structure for fixing the air bag of the present invention, there is no possibility of gas leaking outside from the gap between the mouth of the air bag and the neck of the retainer so that the gas pressure from the inflator can be effectively used as the development pressure of the air bag. Therefore, an small-capacity inflator can be employed as the inflator for this air bag device.

What is claimed is:

1. An air bag mounting structure for a passenger-side air bag, comprising:

a retainer including an inflator housing for receiving an inflator therein, a neck portion formed at one side of the inflator housing, and an air bag housing connected to the neck portion at a side opposite to the inflator housing, and having a collar portion extending laterally outwardly from the neck portion above the inflator housing, an air bag disposed inside the air bag housing and having a gas inlet for receiving a gas therein, and a mouth formed around the gas inlet, and a mounting frame situated inside the air bag housing and having a flange disposed on the collar portion above the neck portion so that when the air bag is attached to the retainer, the mouth of the air bag is sandwiched between the collar portion and the flange in the air bag housing, and a frame portion situated radially inside the flange and extending downwardly therefrom to define a center opening, said frame portion being disposed in the neck portion.

2. An air bag mounting structure for a passenger-side air bag device as claimed in claim 1, wherein said mouth is provided with flaps extending from the peripheral edge of said mouth, said flaps being disposed between said flange of said mounting flame and said collar portion of said retainer.

3. An air bag mounting structure for a passenger-side air bag device as claimed in claim 2, wherein said fastening members penetrate said collar portion and said flaps.

4. An air bag mounting structure for a passenger-side air bag device as claimed in claim 2 or 3, wherein said mounting frame is provided with hooks, said hooks being inserted into hook entries disposed on said flaps whereby said flaps engage with the mounting frame.

5. An air bag mounting structure for a passenger-side air bag as claimed in claim 1, wherein said mouth of the air bag is disposed under the flange by passing through the center opening and being bent laterally outwardly from the center opening so that the flange with the mouth is fixed to the air bag housing.

6. An air bag mounting structure for a passenger-side air bag as claimed in claim 5, further comprising fastening members penetrating the collar portion and the mouth of the air bag and being fixed to the mounting frame.

* * * * *